United States Patent
Koteich et al.

(10) Patent No.: US 12,301,142 B2
(45) Date of Patent: May 13, 2025

(54) DETERMINATIONS OF STATIC LOAD TORQUE AT STANDSTILL

(71) Applicant: Schneider Toshiba Inverter Europe SAS, Pacy sur Eure (FR)

(72) Inventors: Mohamad Koteich, Vernon (FR); Pascal Combes, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 83 days.

(21) Appl. No.: 18/242,200

(22) Filed: Sep. 5, 2023

(65) Prior Publication Data

US 2024/0120866 A1    Apr. 11, 2024

(30) Foreign Application Priority Data

Sep. 29, 2022 (EP) .................................. 22306447

(51) Int. Cl.
*H02P 21/20* (2016.01)
*H02P 21/14* (2016.01)

(52) U.S. Cl.
CPC ............ *H02P 21/20* (2016.02); *H02P 21/141* (2013.01); *H02P 2207/05* (2013.01)

(58) Field of Classification Search
CPC .... H02P 21/20; H02P 21/141; H02P 2207/05; H02P 25/022; H02P 21/14
USPC .............................. 318/400.02, 400.01, 700
See application file for complete search history.

(56) References Cited

U.S. PATENT DOCUMENTS

| | | | |
|---|---|---|---|
| 6,429,620 B2 * | 8/2002 | Nakazawa | H02P 25/08 318/459 |
| 2022/0077801 A1 | 3/2022 | Jebai et al. | |

FOREIGN PATENT DOCUMENTS

CN             113442111 A        9/2021

OTHER PUBLICATIONS

Shuang, Bo et al., "Simultaneous Sensorless Rotor Position and Torque Estimation for IPMSM at Standstill and Low Speed Based on High-Frequency Square Wave Voltage Injection", IEEE Transactions on Industrial Electronics, vol. 69, No. 9, Sep. 29, 2021, pp. 8791-8802.

(Continued)

*Primary Examiner* — David Luo
(74) *Attorney, Agent, or Firm* — Troutman Pepper Locke LLP

(57) ABSTRACT

Examples include a method for determining a static load torque at standstill applied to a salient pole synchronous motor. The method comprises fixing a first non-zero torque-producing current component and controlling motor speed using a speed loop regulation of a first regulated component to reach a first zero motor speed steady state corresponding to the fixed first non-zero current component, the motor being subjected to the specific static load torque. The method further comprises controlling motor speed using a speed loop regulation of a second regulated component to reach a second zero motor speed steady state corresponding to a fixed second non-zero torque-producing current component, the motor being subjected to the specific static load torque, the first non-zero current component and the second non-zero current component corresponding to different values. The load torque is estimated as a function of components of the first and second zero motor speed steady states.

15 Claims, 6 Drawing Sheets

(56) References Cited

OTHER PUBLICATIONS

European Search Report and Search Opinion dated Apr. 4, 2023 for corresponding European Patent Application No. EP22306447.8, 11 pages.

* cited by examiner

DETERMINATIONS OF STATIC LOAD TORQUE AT STANDSTILL

FIELD OF THE INVENTION

This invention relates to a determining a static load torque at standstill in a salient pole synchronous motor using a variable speed drive, and to a computer-readable storage medium, variable speed drive and server implementing said method.

BACKGROUND

In a conventional variable speed drive of a synchronous electrical motor, a control law is executed by a processing unit and receives an input reference. As a function of such input reference and of measurements of values on the motor, the processing unit determines a voltage reference to be applied to the electrical motor. From this voltage reference, the processing unit determines the control voltages to be applied to each output phase connected to the motor. These voltages are applied to the motor using an electronic power topology.

In order to obtain a precise motor control, the control law can take a static load torque at standstill of the motor into account. Such a static load torque at standstill may for example be due to friction introduced by bearings of the motor, and tends to be motor dependent. While other load torques may intervene which may be speed dependent, the static load torque behaves as a constant at reduced motor speed. Estimating such static load torque at standstill can help increasing precision at motor start, impacting motor performance, motor health or motor lifetime.

The aim of the invention is to propose a method for determining the static load torque at standstill in a salient pole synchronous motor using a variable speed drive, the method permitting avoiding or mitigating issues introduced by uncertainties as to the value of such static load torque at standstill.

SUMMARY

The invention is defined by the appended independent claims. Additional features and advantages of the concepts herein disclosed are set forth in the description which follows.

The present disclosure describes a method for determining, using a variable speed drive, VSD, a specific static load torque at standstill applied to a salient pole synchronous motor, the method comprising:
  obtaining, at the VSD, motor inductance information;
  fixing, by the VSD, a first non-zero current component, the first non-zero current component being a torque producing current component of two components forming a first two-dimensional current coordinate system;
  controlling, by the VSD, a motor speed using a first speed loop regulation of a first regulated component, the first two-dimensional current coordinate system being formed by the first non-zero current component and by the first regulated component, to reach a first zero motor speed steady state corresponding to the fixed first non-zero current component and to the motor inductance information, the motor being subjected to the specific static load torque;
  recording, at the VSD, components of the first zero motor speed steady state;

fixing, by the VSD, a second non-zero current component, the second non-zero current component being a torque producing current component of two components forming a second two-dimensional current coordinate system, whereby the first non-zero current component and the second non-zero current component correspond to different values along the torque producing current component axis of the first two-dimensional current coordinate system;
  controlling, by the VSD, a motor speed using a second speed loop regulation of a second regulated component, the second two-dimensional current coordinate system being formed by the second non-zero current component and by the second regulated component, to reach a second zero motor speed steady state corresponding to the fixed second non-zero current component and to the motor inductance information, the motor being subjected to the specific static load torque;
  recording, at the VSD, components of the second zero motor speed steady state; and
  estimating the specific static load torque at standstill as a function of the inductance information, of a number of pole pairs of the motor, and of the components of the first and second zero motor speed steady states.

Such a method permits determining a potential motor health issue.

In some cases, the method comprises operating the motor with the VSD taking the specific static load torque at standstill estimate into account. Taking such estimate into account can indeed improve performance in motor control.

In some cases, the second two-dimensional current coordinate system is the same as the first two-dimensional current coordinate system. Operating in a same two-dimensional current coordinate system to determine the components of both of the first and second zero motor speed steady states permits simplifying the operation.

In some cases, the motor inductance information comprises d-axis and q-axis inductance values of the motor. Such inductance information permits determining for example a saliency inductance value $L_\Delta$ defined as $L_\Delta = L_d - L_q$, whereby $L_d$ is the d-axis inductance value and $L_q$ the q-axis inductance value.

In some cases, the torque producing current component of the first two-dimensional current coordinate system is a quadrature current, $i_q$, and the first regulated component is a direct current, $i_d$. Operating in a $(i_d, i_q)$ first two-dimensional current coordinate system facilitates ensuring that the first non-zero current component and the second non-zero current component correspond to different values along the torque producing current component axis of the first two-dimensional current coordinate system.

In some cases, the torque producing current component of the second two-dimensional current coordinate system is a stator current magnitude, $I_S$, whereby the second regulated component is a stator current angle, $\gamma$. Operating in a $(I_S, \gamma)$ two-dimensional current coordinate system at fixed stator current magnitudes can avoid reaching excessive current values as a result of the speed loop regulations.

In some cases, the motor is a permanent magnet synchronous motor, the method further comprising determining a permanent magnet flux estimate of a rotor of the motor as a function of the inductance information, and as a function of the components of the first and second zero motor speed steady states. Such additional determination permits introducing an additional degree of precision in characterizing a specific motor, leading to an improved control of the specific motor. In some cases, the method comprises operating the motor with the VSD taking the permanent magnet flux value estimate into account.

In some cases, the method further comprises detecting, at the VSD, a difference between the estimated specific static load torque at standstill and a reference value. This permits detecting a level of motor deterioration.

In some cases, the method comprises receiving, at the VSD, motor position sensor data from one or more sensors, the one or more sensors comprising one or more of a hall sensor, of a resolver and of an optical encoder sensor. Relying on sensor data permits obtaining a satisfactory precision in operating the speed loop regulation without having to rely on a sensorless position estimator.

In some examples, the method comprises transmitting, by the VSD, estimate information over a network. Such sending permits transmitting the measures to a remote location.

The present disclosure also describes a non-transitory computer-readable storage medium comprising instructions which, when executed by a processor, cause the processor to carry out any of the methods hereby described. Such processor may for example be a processor of a variable speed drive of the synchronous motor.

The present disclosure also describes a variable speed drive of a salient pole synchronous motor, the variable speed drive comprising a processor and a memory, the processor being configured to operate according to any of the methods hereby described. Such variable speed drive may thereby operate or control the motor with increased reliability.

In some examples, the VSD comprises a networking module to communicate estimate information over a network. Such module is particularly suited to operating in a networked or remote context.

The present disclosure also describes a server comprising a processor, a networking module and a memory, whereby the server is connected via a network to a plurality of variable speed drives comprising a networking module to communicate estimate information over a network. Such centralized collection of information permits running a statistical analysis and detecting potential issues affecting one or more types of motors or motor fleets.

DETAILED DESCRIPTION

Figure 1:
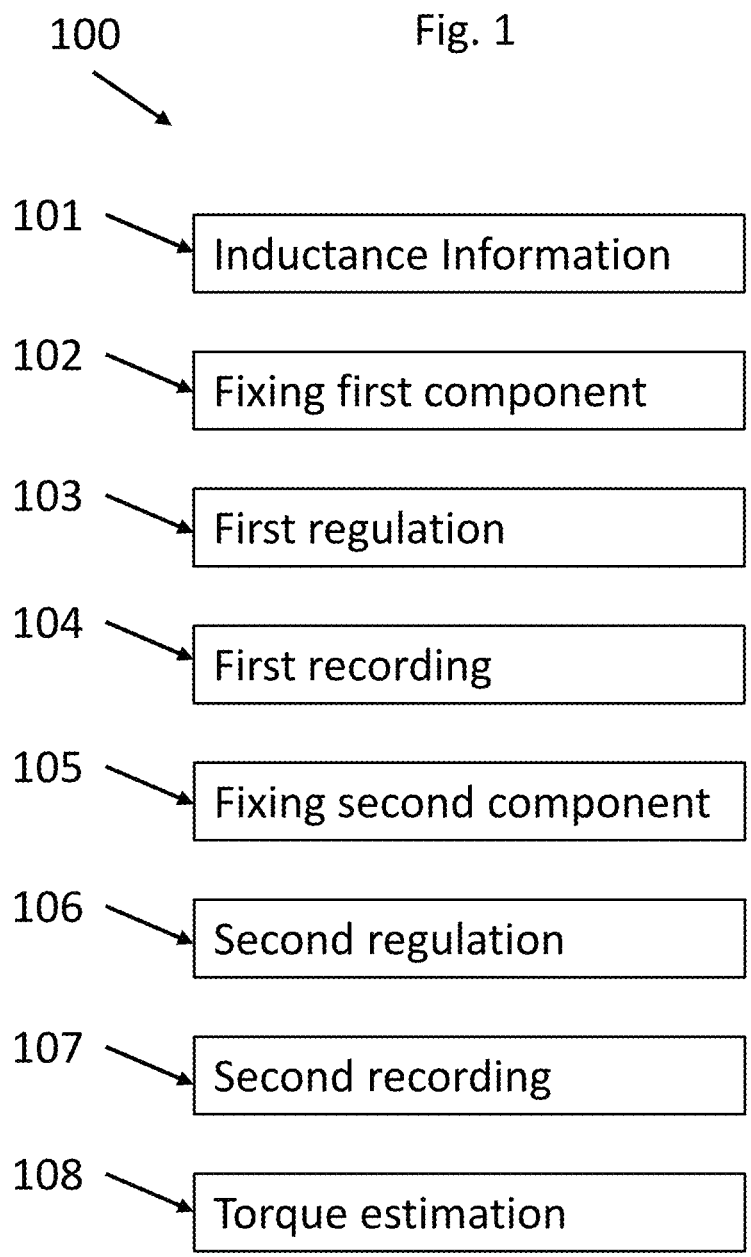
FIG. 1 illustrates an example method.

This disclosure applies to a salient pole synchronous motor using a variable speed drive. A variable speed drive should be understood in this disclosure as an electronic control unit for an electric motor. In some examples, a variable speed drive comprises a processing and control unit intended to implement a control law by taking into account, for example, an input speed set point, currents in the electric motor during normal operation of the motor and control instructions to be applied to an inverter stage in order to obtain these output voltages. The control law may be of a vector or a scalar type.

According to this disclosure, a synchronous motor is controlled by, or using, the variable speed drive. A synchronous motor should be understood as an alternating-current (AC) electric motor designed to run at a speed which varies with the frequency of a power source applied to a stator of the motor. Operating a synchronous motor may be challenging and a synchronous motor starting procedure may be implemented in a control law applied by the variable speed drive of the synchronous motor to start. In some example synchronous motors according to this disclosure, the motor speed or position is maintained or obtained by a permanent magnet rotor, by windings of a rotor excited by an external DC field equivalent to a permanent magnet, or by geometric saliency, i.e. the fact that the rotor inductance in one direction is larger than in the other, and such rotor will tend to revolve at the same speed as a magnetic field generated by the power source applied to stator windings, or tend to maintain a specific position by applying a torque corresponding to such magnetic field generated by the power source applied to stator windings. In other words, in a stable state of operation, the rotor rotates at the same speed as a revolving field generated by the stator or maintains a specific position. In some examples, the stator comprises a cylindrical frame with windings, such as three-phase windings, located in slots of the stator. During stable operation, as a mechanical load is applied, the rotor slips back a number of degrees with respect to a rotating field of the stator, developing torque and continuing to be drawn around by this rotating field. The rotor may also comprise a combination of one or more windings in addition to one or more permanent magnets, such as a damper winding for example. The use of permanent magnets may eliminate or reduce the use of slip rings and of an external power source dedicated to generating a rotor magnetic field by means of rotor windings.

A motor according to this disclosure may, during its regular operation, be submitted to different types of load torques. Such load torques may comprise components dependent on a load external to the motor and mechanically coupled to the motor. Such load torque may also comprise components originating from the motor itself, for example by friction within the motor. A component of such different types of load torques is the static load torque at standstill, which takes a value participating in identifying the characteristics, in particular the mechanical characteristics, of the motor. In other words, knowledge of the static load torque at standstill improves the characterization of the motor concerned. As mentioned above, such static load torque at standstill behaves as a constant as reduced motor speeds, in other words in the vicinity of a standstill behavior of the motor. The challenges linked to starting a synchronous motor from standstill are eased by identifying such static load torque at standstill, by using a value of the static load torque at standstill as a feedforward in a speed controller in order to avoid a sluggish speed response. Determining the static load torque at standstill at different points in time over a lifetime of a motor can also provide information as to motor bearings health evolution. The static load torque at standstill may indeed evolve over time, the use of an approximated static load torque at standstill for motor control introducing control inaccuracies. Such inaccuracies have a negative impact on controlling the motor. The methods hereby described reduce or prevent such negative impact. Such methods rely on fundamentals of motor control theory, such theory describing relationships between stator currents, motor inductances and static load torque at standstill. The methods hereby disclosed permit ascertaining static load torque at standstill in a reproduceable manner.

FIG. 1 illustrates an example method 100 for determining, using a VSD, a specific static load torque at standstill applied to a salient pole synchronous motor. A salient pole synchronous motor should in this disclosure be understood as a motor having a non-zero saliency inductance value $L_\Delta$, defined as mentioned above by $L_\Delta = L_d - L_q$, whereby $L_d$ is the d-axis inductance value and, $L_q$ the q-axis inductance value of the motor. A salient pole synchronous motor may alternatively be defined as exhibiting magnetic saliency, whereby $L_d \neq L_q$. Magnetic saliency describes the relationship between the rotor main flux (d axis) inductance and the main torque-producing (q axis) inductance. The d-axis inductance value, $L_d$, and the q-axis inductance value, $L_q$, may be obtained for example from motor specifications or by known signal injection techniques which will not be described here. In some examples, inductance information is obtained on the fly, in some example once during a method, in some example at different iterations during the method.

As illustrated in bloc 101, method 100 comprises obtaining, at the VSD, motor inductance information. Such inductance information may for example directly comprise d-axis $L_d$ and q-axis $L_q$ inductance values of the motor, may for example directly comprise saliency inductance value $L_\Delta$, or may comprise other parameters from which inductance values may be derived. Such obtaining of inductance information may take place once, in particular prior to proceeding with blocks 101-108. Such obtaining of inductance information may take more than once in order to update such information, in particular prior to proceeding with blocks 102 and 103, and again prior to proceeding with blocks 105 and 106. Such updating of inductance information when operating different regulations corresponding to the first and the second steady states may in particular be combined with examples whereby difference in values between first non-zero current component and the second non-zero current component along the torque producing current component axis correspond to more than a specific threshold as will be explained below, for example in order to take changes in magnetic saturation into account between the first and the second steady states. Said differently, an increase in difference in values between first non-zero current component and the second non-zero current component along the torque producing current component axis may preferably be combined with the updating of inductance information when operating different regulations corresponding to the first and the second steady states.

As illustrated in block 102, method 100 comprises fixing, by the VSD, a first non-zero current component, the first non-zero current component being a torque producing current component of two components forming a first two-dimensional current coordinate system.

Example two-dimensional current coordinate systems are polar or quadrature systems. An example two-dimensional current coordinate system is the d-axis and q-axis or direct axis and quadrature axis of the stator of the motor. In this $(i_d, i_q)$ quadrature representation or system, a direct axis current is used to control the rotor magnetizing flux, while a corresponding quadrature axis current corresponds to a motor torque. The direct axis current and the quadrature axis current are the components of the $(i_d, i_q)$ two-dimensional current coordinate system. Another example two-dimensional current coordinate system is a polar coordinate system, whereby the two components are polar components $\gamma$ and $I_S$, whereby $I_S$ is the stator current magnitude and $\gamma$ is the stator current angle. Stator current angle $\gamma$ should be understood as $\gamma = \mathrm{a\,tan\,2}(-i_d, i_q)$, where a tan 2 is the 2-argument arctangent function returning the argument, phase or angle of the complex number $-i_d + j i_q$ (where $j^2 = -1$). In other words $i_d = -I_S \sin(\gamma)$ and $i_q = I_S \cos(\gamma)$. Any operating point of the motor may be represented in a two-dimensional current coordinate system. Real currents may be applied to stator windings to reach a desired operating point. Yet another example two-dimensional current coordinate system is the $(I_\alpha, I_\beta)$ quadrature representation where $I_\alpha$ and $I_\beta$ are representing, respectively, the current applied to the stator windings in the stator alpha axis representation and the current applied to the stator windings in the stator beta axis representation, whereby the alpha, beta representation is a quadrature orthogonal coordinate system whereby the alpha axis is aligned with one of the phases of the stator current space. One should understand that while different representations may be used in specific examples of the methods according to this disclosure, the same underlying physical principles are applied.

The first non-zero current component is a torque producing current component of two components forming a first two-dimensional current coordinate system. A torque producing component should be understood as a component of the first two-dimensional current coordinate system which participates or contributes to torque production. In some examples, such torque producing current component of the first two-dimensional current coordinate system is a non-zero quadrature current, $i_q$. In some example, such torque producing current component of the first two-dimensional current coordinate system is a non-zero stator current magnitude $I_S$. Such first non-zero current component is fixed in order to fix one component of a first steady state as will be explained below. In some examples, the fixed non-zero stator current magnitude $I_S$ is of less than twice a nominal stator current magnitude. In some examples, the fixed non-zero stator current magnitude $I_S$ is of less than 150% of a nominal stator current magnitude. In some examples, the fixed non-zero stator current magnitude $I_S$ is of less than 100% of a nominal stator current magnitude. Limiting the fixed non-zero stator current magnitude $I_S$ permits avoiding damaging the motor.

As illustrated in block 103, method 100 comprises controlling, by the VSD, a motor speed using a first speed loop regulation of a first regulated component, the first two-dimensional current coordinate system being formed by the first non-zero current component and by the first regulated component, to reach a first zero motor speed steady state corresponding to the fixed first non-zero current component and to the motor inductance information, the motor being subjected to the specific static load torque. A static load corresponds in this disclosure to the torque applied to the motor at zero speed, i.e. the specific static load torque. Since the example methods hereby described are operating at zero speed at steady state, the motor is only submitted to static load torque at steady state. During transient operation, the motor speed may be non-zero, but it remains low, so the torque remains close to the static load. The first speed loop regulation operates in the first two-dimensional current coordinate system, one of the components of the first two-dimensional current coordinate system being fixed as per block 102, the other component being used for regulation. In some examples, the fixed torque producing current component of the first two-dimensional current coordinate system is a quadrature current, $i_q$, and the first regulated component is a direct current, $i_d$. In other examples, the fixed torque producing current component of the first two-dimensional current coordinate system is a stator current magnitude, $I_S$, and the first regulated component is a stator current angle, $\gamma$. Once the first zero motor speed steady state is reached, the motor will be in a situation in which both the resulting first regulated component and the fixed first non-zero current component are known (at the VSD), and are associated to the specific static load torque.

It should be understood that the controlling takes place while maintaining the fixed first non-zero current component during block 103.

As illustrated in block 104, method 100 comprises recording, at the VSD, components of the first zero motor speed steady state which may correspond directly to the resulting first regulated component and the fixed first non-zero current component from the first two-dimensional current coordinate system, or to components in another, different, two-dimensional current coordinate system. Such coordinates may be recorded in different manners, for example by recording reached $I_S$ and $\gamma$ values, or recording reached $i_d$ and $i_q$ values. Such recording may take place for example in a VSD memory or in a memory of a server connected to the VSD.

In example method 100, blocks 102, 103 and 104 are reproduced as respective blocks 105, 106 and 107, whereby blocks 105, 106 and 107 are reproduced using a second non-zero current component, a second two-dimensional current coordinate system, a second speed loop regulation of a second regulated component to reach a second zero motor speed steady state as will be explained below in more details. One should note that the first non-zero current component and the second non-zero current component correspond to different values along the torque producing current component axis of the first two-dimensional current coordinate system. This difference in torque producing current component forces the motor into two different zero motor speed steady states (the first and the second), a same static load torque at standstill being applied, such determination of different zero motor speed steady states permitting obtaining the static load torque at standstill as will be explained below. It was found that accuracy in estimations as per block 108 (or as per block 310 which will be explained below) was increased as the difference in values between first non-zero current component and the second non-zero current component along the torque producing current component axis was increased. In some examples, the difference in values between first non-zero current component and the second non-zero current component along the torque producing current component axis corresponds to more than 10% of a nominal stator current magnitude. In some examples, the difference in values between first non-zero current component and the second non-zero current component along the torque producing current component axis corresponds to more than 25% of a nominal stator current magnitude. In some examples, the difference in values between first non-zero current component and the second non-zero current component along the torque producing current component axis corresponds to more than 50% of a nominal stator current magnitude.

As illustrated in block 105, example method 100 comprises fixing, by the VSD, a second non-zero current component, the second non-zero current component being a torque producing current component of two components forming a second two-dimensional current coordinate system, whereby the first non-zero current component and the second non-zero current component correspond to different values along the torque producing current component axis of the first two-dimensional current coordinate system. One should note that in some examples, the second two-dimensional current coordinate system is the same as the first two-dimensional current coordinate system. In some examples, the first and the second two-dimensional current coordinate systems are different.

As illustrated in block 106, method 100 comprises controlling, by the VSD, a motor speed using a second speed loop regulation of a second regulated component, the second two-dimensional current coordinate system being formed by the second non-zero current component and by the second regulated component, to reach a second zero motor speed steady state corresponding to the fixed second non-zero current component and to the motor inductance information, the motor being subjected to the specific static load torque. The submitting of the motor to the same specific static load torque during both the first and the second speed loop regulations permit obtaining the specific static load torque.

It should be understood that the controlling takes place while maintaining the fixed second non-zero current component during block 106.

In some examples, both the first and the second two-dimensional current coordinate systems are the d-axis and q-axis or direct axis and quadrature axis of the stator of the motor, or $(i_d, i_q)$ representation. In such a representation, the first non-zero current component and the second non-zero current component are different $i_q$ values, the first and second regulated components being $i_d$ values.

In some examples, both the first and the second two-dimensional current coordinate systems are the polar stator current angle, $\gamma$, coordinate frame, whereby the two components are polar components $\gamma$ and $I_S$, whereby $I_S$ is the stator current magnitude. In such a representation, the first non-zero current component and the second non-zero current component may be different $I_S$ values corresponding to different $i_q$ values. In some such examples, the fixed torque producing current component of the second two-dimensional current coordinate system is a stator current magnitude, $I_S$, and the regulated component is the stator current angle, $\gamma$.

As illustrated in block 107, method 100 comprises recording, at the VSD, components of the second zero motor speed steady state which may correspond directly to the resulting second regulated component and the fixed second non-zero current component from the second two-dimensional current coordinate system, or to components in another, different, two-dimensional current coordinate system. Such coordinates may be recorded in different manners, for example by recording reached $I_S$ and $\gamma$ values, or recording a reached $i_d$ and $i_q$ values. Such recording may take place for example in a VSD memory or in a memory of a server connected to the VSD.

As illustrated in block 108, method 100 comprises estimating the specific static load torque at standstill as a function of the inductance information, of a number of pole pairs of the motor, and of the components of the first and second zero motor speed steady states. It was indeed found that physical relationships related these different values in such a manner that knowledge of the inductance information, of the number of pole pairs of the motor, and of the components of the first and second zero motor speed steady states permitted ascertaining the specific static load torque at standstill. While specific equations will be exemplified below which illustrates such physical relationship, it should be understood that other conventions may be used which would rely on the same physical relationship to ascertain the specific static load torque at standstill as per the example methods hereby disclosed.

A number of pole pairs of the motor should be understood as a number of pole pairs on a rotor of the motor, whereby a rotor comprises a same number of opposite poles, such number being the pole pair number. One should note that the stator also has such a pole configuration.

Figure 2:
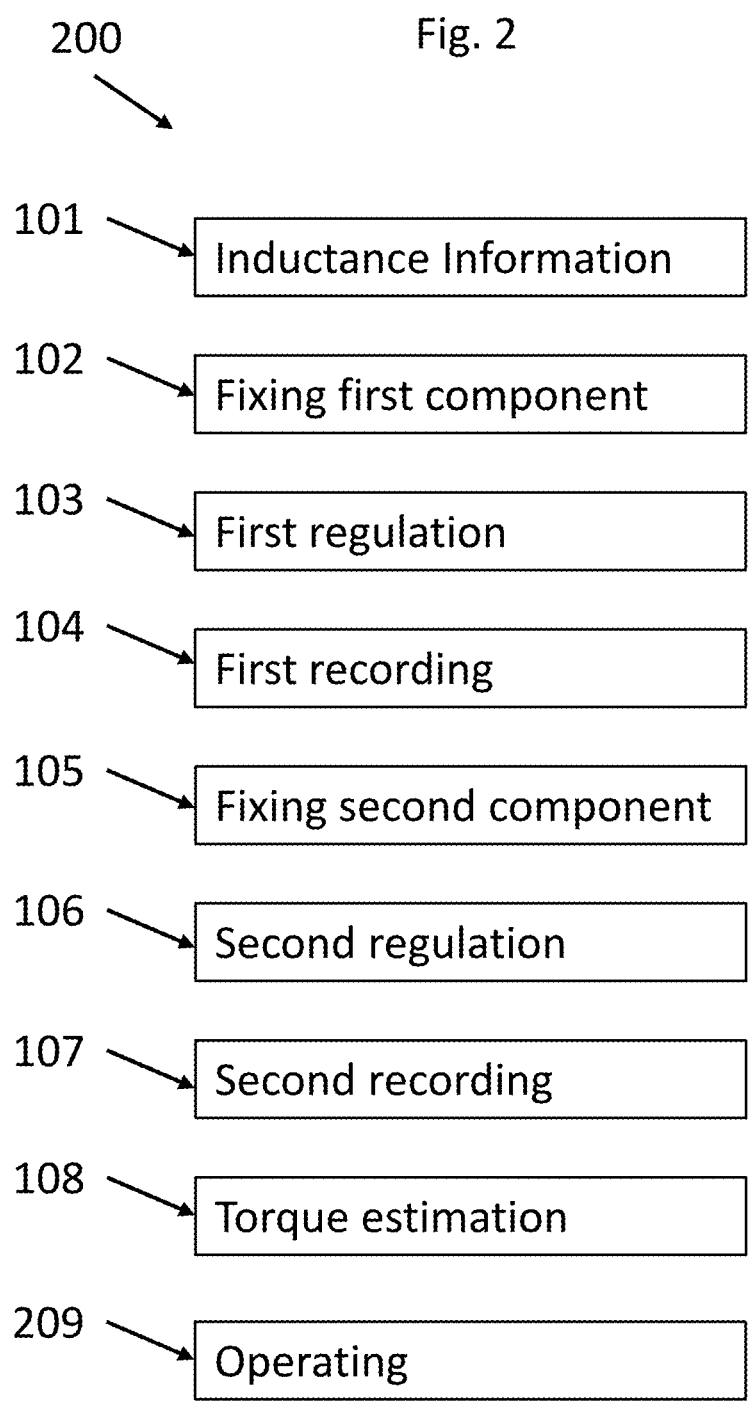
FIG. 2 illustrates another example method.

FIG. 2 illustrates another example method 200 according to this disclosure. Example method 200 comprises blocks 101-108 as described in the context of example method 100. Example method 200 further comprises block 209 of operating the motor with the VSD taking the specific static load torque at standstill estimate into account. This permits operating the motor using a control law which is a closer reflection of real motor characteristics, leading to a more precise operation.

Figure 3:
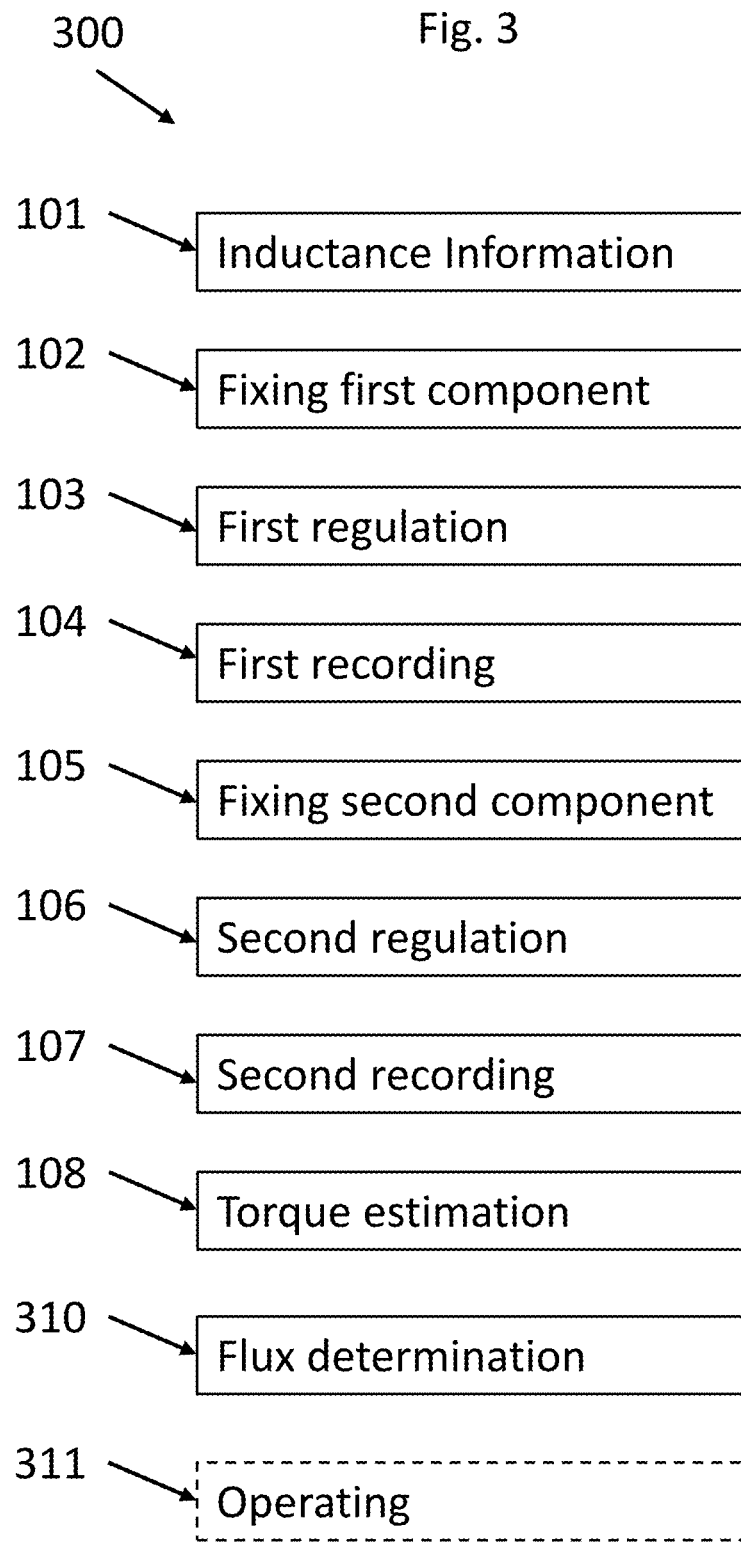
FIG. 3 illustrates a further example method.

FIG. 3 illustrates another example method 300 according to this disclosure. Example method 300 comprises blocks 101-108 as described in the context of example method 100. In example method 300, the motor is a permanent magnet synchronous motor (PMSM). Method 300 further comprises, in block 310, determining a permanent magnet flux estimate of a rotor of the motor as a function of the inductance information, and of the components of the first and second zero motor speed steady states. Again, while a specific equation will be exemplified below which illustrates such physical relationship, it should be understood that other conventions may be used which would rely on the same physical relationship to ascertain the specific static load torque at standstill as per the example methods hereby disclosed.

In case of use of a PMSM, the magnetic flux value produced by one or more permanent magnets of a rotor is a function of each permanent magnet, and may in principle not be evaluated in a simple manner. Such magnetic flux value should however be taken into account as a factor in a control law aimed at driving the motor. In some cases, such magnetic flux value is provided by a manufacturer of the motor, for example on a visible plaque displaying motor characteristics or on a motor data sheet. A user of the motor may then use such manufacturer provided magnetic flux value as a factor of the control law used to operate the motor. The magnetic flux value may also evolve over time, the material of the permanent magnet being submitted to external influences such as temperature and external magnetic field which may impact an original magnetic flux value and modify it. Such inaccuracies have a negative impact on controlling the motor. Example method 300 hereby described permits detecting such negative impact.

As illustrated in optional block 311 of example method 300, method 300 may comprise operating the motor with the VSD taking the permanent magnet flux value estimate into account.

In some specific cases, example methods comprise detecting, at the VSD, a difference between the estimated specific static load torque at standstill and a reference value.

Such detecting of a difference between the estimated specific static load torque at standstill and a reference value permits for example taking a drift threshold into account, whereby a drift threshold should be understood as a threshold representing a drift in static load torque at standstill. A drift should be understood as corresponding to a minor variation or deterioration in static load torque at standstill, such as a variation of less than 25%, of less than 20%, of less than 15% or of less than 10%. The threshold still should correspond to detecting some variation, for example a variation of more than 0.5%, of more than 1%, of more than 2%, of more than 3%, of more than 4% or of more than 5%. The threshold may be defined relative to a reference value, for example a nominal static load torque at standstill, for example a value determined at the end of a motor manufacturing line, for example a value determined by an example method at an earlier point in time, or may be defined in an absolute manner. Such detection of a difference may be combined with the providing of an alert as will be described below.

Figure 4:
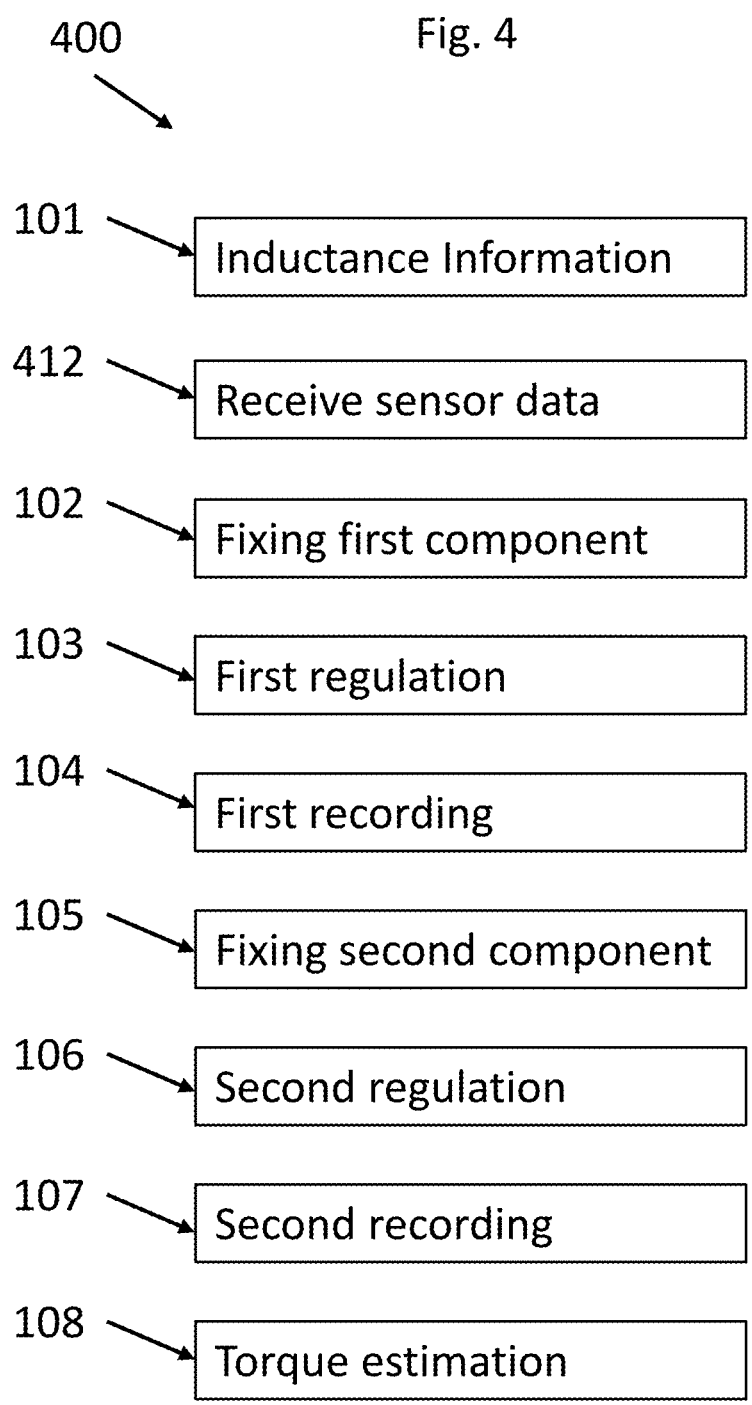
FIG. 4 illustrates yet another example method.

FIG. 4 illustrates another example method 400 according to this disclosure. Example method 400 comprises blocks 101-108 as described in the context of example method 100. While not represented here, example method 400 may be combined with block 209 and/or with blocks 310 or both blocks 310 and 311. Example method 400 further comprises block 412 of receiving, at the VSD, motor position sensor data from one or more sensors, the one or more sensors comprising one or more of a hall sensor, of a resolver and of an optical encoder sensor. While an example motor may be operated in a sensorless mode, operating the motor relying on sensor data can improve accuracy in controlling the motor speed. In some examples, the motor position data corresponds to a rotor position provided by an optical encoder reading, the encoder being coupled with the rotor, by processing resolver data of a resolver coupled to the rotor, or by readings from, for example, hall sensors disposed around the rotor, for example three hall sensors disposed around the rotor, whereby adjacent hall sensors are separated from each other for example by an angle of about 120 degrees.

Example methods 100, 200, 300 or 400 according to this disclosure may further comprises transmitting, by the VSD, estimate information over a network. Such estimate information may relate to the specific static load torque at standstill or to both the specific static load torque at standstill and the permanent magnet flux value estimate of a PMSM. Such sending or transmitting may for example take place via a networking module of the variable speed drive. Such sending can permit collecting data in order to monitor motor health remotely. Such sending may be wireless or by wire, or maybe a combination of both. Indeed, in some examples, the VSD comprises a networking module to communicate the estimate information.

In some examples, transmitting, by the VSD, estimate information over a network can permit providing an alert. Such alert may be a bearing failure alert aimed at a user, an operator, or at a monitoring computing system. Such an alert may be displayed on a screen, for example a screen of the variable speed drive, or may be transmitted as an electromagnetic signal, for example via a communication network. A number of actions may be taken in response to the alert, comprising one or more of the sending of a maintenance operator, the ordering of a replacement component such as a replacement bearing or a replacement permanent magnet rotor, or the ordering of a replacement motor. The providing of such an alert may prevent or reduce operational downtime, or damage to an industrial system in which the motor may be included.

In some examples, example methods according to this disclosure comprise displaying the determined the estimate information. Such display, for example on a screen of the variable speed drive, can permit real time monitoring by a user, as long as the motor is at standstill, permitting for example operating the motor in extreme conditions while avoiding or limiting permanent damage.

In order to avoid or reduce an impact of the example methods on productivity, any of the methods hereby described may be applied to a motor which is assigned a repetitive mission profile comprising no-load time intervals at standstill, whereby the example methods are operated at no-load at standstill during such time intervals, no-load being understood as an absence of external load. A repetitive mission profile should be understood as a repetitive operational activity, involving for example both a specific motor speed and specific motor load. In other examples, an example method according to this disclosure may be decoupled from the operational functioning of the motor. In some examples, the running of an example method according to this disclosure may be triggered by a user. In some examples, the VSD is configured to operate the synchronous motor in a standstill mode, whereby example methods hereby described may be integrated in such standstill mode.

In some examples, any of the methods hereby described take place in a no-load situation. A no-load situation should be understood as a situation in which an external load applied to the motor is considered negligeable, for example of less than 0.5% of a nominal load. In some examples, the motor is considered as in a no-load situation when decoupled from a load external to the motor. One should note that decoupling, in particular mechanically decoupling, a motor from a load will not suppress a minor load introduced for example by bearings of the motor itself, in other words, and as mentioned above, a "no-load" situation is not strictly speaking a zero load situation. In some examples, a no-load situation corresponds to a situation whereby no static external load is applied to the motor. In some examples, a no-load situation as per the present disclosure corresponds to an "end-of-line" situation, whereby the motor is assessed, using an example method according to this disclosure, at the end of a motor manufacturing line in order to determine the specific static load torque at standstill or both the specific static load torque at standstill and the permanent magnet flux value estimate of a PMSM prior to releasing the motor for operation. In some examples, a level of "no-load" is dependent on a desired precision as to determination of the specific static load torque at standstill or of both the specific static load torque at standstill and the permanent magnet flux value estimate of a PMSM, whereby a higher precision may be obtained in a no-load situation whereby an external load is of less than 0.1% of a nominal load compared to a no-load situation whereby an external load is of less than 0.2% of the nominal load. Example methods may indeed comprise setting a threshold magnetic torque value, whereby a situation is considered as no-load if the magnetic torque corresponding to an external load is of less than the threshold. In some examples, such threshold magnetic torque value is of 1% of a nominal magnetic torque, of 0.5% of a nominal magnetic torque, of 0.2% of a nominal magnetic torque or of 0.1% of a nominal magnetic torque of the motor.

In some examples, any of the methods hereby described comprise modifying a maintenance plan in function of the estimate information. A maintenance plan may for example comprise one or more action items related to one or more of a motor component replacement, a maintenance visit by a maintenance operator or the running of a maintenance routine.

In some examples, example methods according to this disclosure further comprise recording an evolution of estimate information over time. Such evolution record may be for example stored in a memory of the variable speed drive according to this disclosure. Such evolution record may also, or alternatively, be stored remotely. Such evolution record may be stored on a centralized data depository, such centralized data depository storing evolution records corresponding to a plurality of variable speed drives, thereby permitting comparing an evolution of such variable speed drives and corresponding electric motors. Such centralized data depository may be maintained by a manufacturer of the electric motor or of the variable speed drive in order to monitor the plurality of variable speed drives and electric motors, thereby permitting implementing preventive measures if a certain evolution is detected for a certain type of variable speed drive or electric motor.

Figure 5:
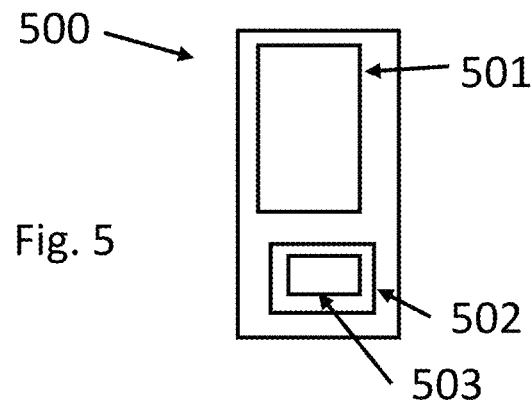
FIG. 5 illustrates an example variable speed drive.

FIG. 5 illustrates an example variable speed drive 500 comprising a processor 501, the processor 501 being configured to operate according to any of the example methods 100, 200, 300 or 400 hereby described. Processor 501 may comprise electronic circuits for computation managed by an operating system.

FIG. 5 also illustrates a non-transitory machine-readable or computer-readable storage medium, such as, for example, memory or storage unit 502 of the variable speed drive, whereby the non-transitory machine-readable storage medium is encoded with instructions 503 executable by a processor such as processor 501, the machine-readable storage medium comprising instructions 503 to operate processor 501 to perform as per any of the example methods hereby described.

A computer readable storage according to this disclosure may be any electronic, magnetic, optical or other physical storage device that stores executable instructions. The computer readable storage may be, for example, flash memory, an Electrically Erasable Programmable Read Only Memory (EEPROM), a storage drive, and optical disk, and the like. As described hereby, the computer readable storage may be encoded with executable instructions according to the example methods hereby described.

Figure 6:
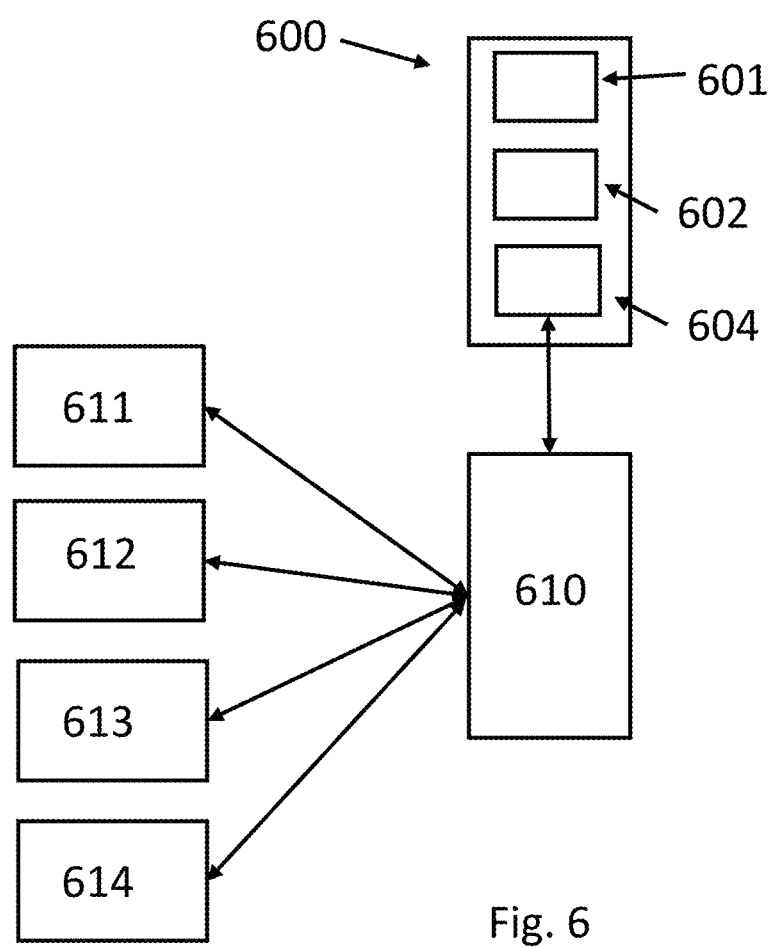
FIG. 6 illustrates another example variable speed drive and an example server.

FIG. 6 illustrates an example variable speed drive 600 comprising a processor 601 and a memory 602, the processor 601 being configured to operate according to any of the methods hereby described comprising transmitting, by the VSD, estimate information over a network. Processor 601 may comprise electronic circuits for computation managed by an operating system. Variable speed drive 600 further comprises a networking module 604. Networking module 604 permits transmitting estimate information according to this disclosure to a centralized data depository or server 610. Example servers include a programmable logic controller (PLC) or an edge controller. Centralized depository 610 may in turn be connected via a network to a plurality of variable speed drives 611-614 according to this disclosure. Such centralized depository may compile estimate information determined according to this disclosure in a memory of the centralized depository, the centralized depository processing such collected data using a processing unit or processor of the centralized depository in order to monitor the plurality of variable speed drives, and respective motors, connected or networked to the centralized depository.

In some examples, a server such as server 610 is to further receive, via the networking module 604 or via a plurality of networking modules from variable speed drives 600, 611-614, estimate information from the plurality of variable speed drives. Combining such estimate information permits precisely monitoring the static load torque at standstill over time for the plurality of variable speed drives and respective motors concerned. In some examples, the server further receives data identifying each motor, or each motor type. In some examples, the processor of the server is to modify a maintenance plan in function of the received measures of comparison. The maintenance plan may take the estimate information into account. Collecting such data may provide a diagnostic for a plurality of motors, for example based on a deviation of the estimate information from predetermined ranges. Such diagnostic may permit preventing or solving issues which otherwise would negatively impact the operation of the electric motor and/or of the variable speed drive. Life expectancy of an electric motor or variable speed drive may indeed be rendered longer by applying a method according to this disclosure.

Figure 7:
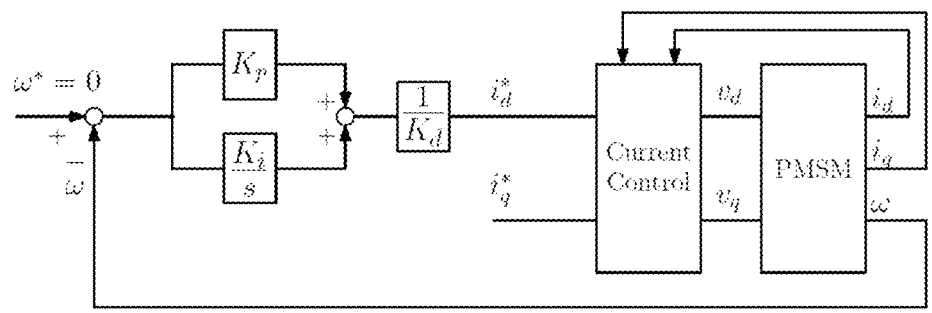
FIG. 7 illustrates an example control loop.

A specific example of speed loop regulation implementing an example method according to this disclosure is illustrated in FIG. 7. Such loop may be used in either or both of blocks 103 or 106. While such examples are applied to a PMSM, they also could be applied to another motor type.

As illustrated in FIG. 7, ω* represents the reference angular motor speed to reach, using the speed loop regulation, which in this disclosure is set to zero (i.e. standstill). The speed loop comprises in this example in a first stage inputting a difference between ω* and a feedback angular motor speed ω in a proportional-integral controller (PID) of gain factor $K_p$ and integral gain $K_i$, whereby s represents the Laplace parameter. The following stage comprises assigning the fixed non-zero stator quadrature current $i_q^*$ and assigning a direct current $i_d^*$ reference value as regulated component in function of a gain $$K_d = \frac{3}{2} n_p L_\Delta i_q^*,$$

whereby $L_\Delta$ is as defined above, whereby $n_p$ is the number of pole pairs of the motor, and whereby $i_q^*$ is the fixed non-zero stator quadrature current. In a further stage, the motor is controlled by assigning corresponding direct and quadrature voltages $v_d$ and $v_q$ at the stator to generate feedback speed ω.

Figure 8:
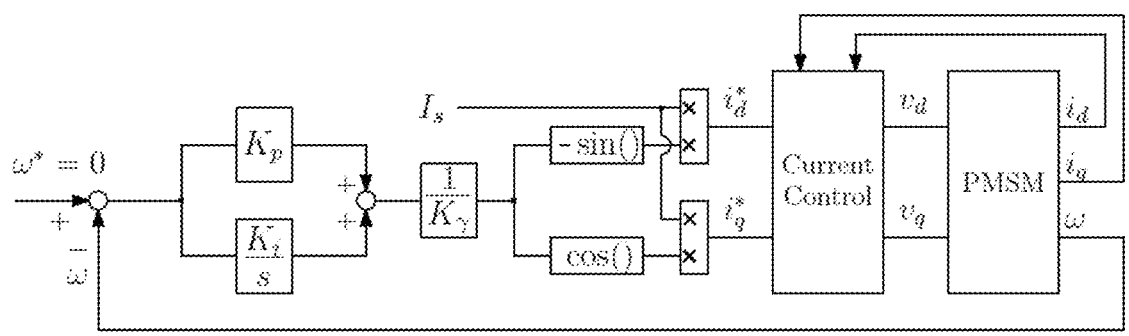
FIG. 8 illustrates another example control loop.

A specific example of speed loop regulation implementing an example method according to this disclosure is illustrated in FIG. 8. Such loop may be used in either or both of blocks 103 or 106. While such examples are applied to a PMSM, they also could be applied to another motor type.

As illustrated in FIG. 8, ω* represents the reference angular motor speed to reach using the speed loop regulation, which in this disclosure is set to zero. The speed loop comprises in this example in a first stage inputting a difference between ω* and a feedback angular motor speed ω in a proportional-integral controller (PID) of gain factor $K_p$ and integral gain $K_i$, whereby s represents the Laplace parameter. The following stage comprises assigning a direct current $i_d^*$ reference value and a quadrature current $i_q^*$ corresponding to a fixed non-zero stator current magnitude $I_S$ and to a regulated stator current angle, γ, through a gain $$K_\gamma = \frac{3}{2} n_p L_\Delta I_s.$$

In a further stage, the motor is controlled by assigning corresponding direct and quadrature voltages $v_d$ and $v_q$ at the stator to generate feedback speed ω.

In FIG. 7, the torque producing current component of the first (or second) two-dimensional current coordinate system is the quadrature current, $i_q$, and the first (respectively second) regulated component is a direct current, $i_d$. In FIG. 7, the loop is operating in a $(i_d, i_q)$ first (respectively second) two-dimensional current coordinate system which facilitates ensuring that the first non-zero current component and/or the second non-zero current component correspond to different values along the torque producing current component axis of the first two-dimensional current coordinate system. In this example, such torque producing current component axis of the first two-dimensional current coordinate system corresponds to the $i_q$ axis.

In FIG. 8, the torque producing current component of the first (or second) two-dimensional current coordinate system is stator current magnitude, $I_S$, whereby the first (respectively second) regulated component is the stator current angle, γ. In FIG. 8 the loop is operating in a $(I_S, \gamma)$ two-dimensional current coordinate system at fixed stator current magnitudes and can avoid reaching excessive current values as a result of the speed loop regulations.

In some examples, a method comprises operating both blocks 103 and 106 as per FIG. 7. In some examples, a method comprises operating both blocks 103 and 106 as per FIG. 8. In some examples, a method comprises operating blocks 103 as per FIG. 7 and block 106 as per FIG. 8. In some examples, a method comprises operating blocks 103 as per FIG. 8 and block 106 as per FIG. 7. In some examples, blocks 103 and/or 106 are operated in an $(I_\alpha, I_\beta)$ quadrature representation.

It should be understood that in order to simplify the representations of FIGS. 7 and 8, while $v_d$ and $v_q$ are represented as input to the PMSM and $i_d$ and $i_q$ are represented as output of the PMSM, such tension and current values are not the values effectively corresponding to the real values in the PMSM stator windings, but a representation of such real values in the $(i_d, i_q)$ quadrature representation.

Different example formulas may be used to estimate the specific static load torque at standstill as per block 108.

In a first example, the following equation is used:

$$\hat{T}_{l0} = -1.5 n_p (L_d - L_q) \frac{i_{d1} - i_{d2}}{i_{q1} - i_{q2}} i_{q1} i_{q2}$$

Where $\hat{T}_{l0}$ is the estimate the specific static load torque at standstill, $i_{d1}$ and $i_{q1}$ are the recorded components of the first zero motor speed steady state as per block 104, and $i_{d2}$ and $i_{g2}$ are the recorded components of the second zero motor speed steady state as per block 107. In this example, the d-axis inductance value and the q-axis inductance value are considered constant. Such d-axis inductance value and q-axis inductance values may be obtained in block 101.

In a second example, the d-axis inductance value and the q-axis inductance value are considered variable, for example due to changes in magnetic saturation, and the following equation is used:

$$\hat{T}_{l0} = -1.5 n_p \frac{(L_{d1} - L_{q1}) i_{d1} - (L_{d2} - L_{q2}) i_{d2}}{i_{q1} - i_{q2}} i_{q1} i_{q2}$$

Where $L_{d1}$ and $L_{q1}$ are the d-axis inductance value and the q-axis inductance values used for blocks 102, 103 and 104, and where $L_{d2}$ and $L_{q2}$ are the d-axis inductance value and the q-axis inductance values used for blocks 105, 106 and 107. Such-axis inductance value and the q-axis inductance values may be obtained in block 101.

In other examples, a control loop may rely on value tables stored for example in storage 602, or on different relations relying on the same or equivalent physical principles.

In some examples, block 310 of determination of rotor permanent magnet flux of a PMSM comprises estimating the rotor permanent magnet flux $\phi_r$ as:

$$\phi_r = -L_\Delta \frac{i_{d1}i_{q1} - i_{d2}i_{q2}}{i_{q1} - i_{q2}}$$

In this example, $L_\Delta$ is considered a constant.

In some examples, block 310 of determination of rotor permanent magnet flux of a PMSM comprises estimating the rotor permanent magnet flux as:

$$\phi_r = -\frac{L_{\Delta 1}i_{d1}i_{q1} - L_{\Delta 2}i_{d2}i_{q2}}{i_{q1} - i_{q2}}$$

In this example, $L_\Delta$ is considered a variable, whereby $L_{\Delta 1}$ corresponds to $L_\Delta$ for blocks 102, 103 and 104, and $L_{\Delta 2}$ corresponds to $L_\Delta$ for blocks 105, 106 and 107.

The invention claimed is:

1. A method for determining, using a variable speed drive, VSD, a specific static load torque at standstill applied to a salient pole synchronous motor, the method comprising:
   obtaining, at the VSD, motor inductance information;
   fixing, by the VSD, a first non-zero current component, the first non-zero current component being a torque producing current component of two components forming a first two-dimensional current coordinate system;
   controlling, by the VSD, a motor speed using a first speed loop regulation of a first regulated component, the first two-dimensional current coordinate system being formed by the first non-zero current component and by the first regulated component, to reach a first zero motor speed steady state corresponding to the fixed first non-zero current component and to the motor inductance information, the motor being subjected to the specific static load torque;
   recording, at the VSD, components of the first zero motor speed steady state;
   fixing, by the VSD, a second non-zero current component, the second non-zero current component being a torque producing current component of two components forming a second two-dimensional current coordinate system, whereby the first non-zero current component and the second non-zero current component correspond to different values along the torque producing current component axis of the first two-dimensional current coordinate system;
   controlling, by the VSD, a motor speed using a second speed loop regulation of a second regulated component, the second two-dimensional current coordinate system being formed by the second non-zero current component and by the second regulated component, to reach a second zero motor speed steady state corresponding to the fixed second non-zero current component and to the motor inductance information, the motor being subjected to the specific static load torque;
   recording, at the VSD, components of the second zero motor speed steady state; and
   estimating the specific static load torque at standstill as a function of the inductance information, of a number of pole pairs of the motor, and of the components of the first and second zero motor speed steady states.

2. The method according to claim 1, the method comprising operating the motor with the VSD taking the specific static load torque at standstill estimate into account.

3. The method according to claim 1, whereby the second two-dimensional current coordinate system is the same as the first two-dimensional current coordinate system.

4. The method according to claim 1, whereby the motor inductance information comprises d-axis and q-axis inductance values of the motor.

5. The method according to claim 1, whereby the torque producing current component of the first two-dimensional current coordinate system is a quadrature current, $i_q$, and whereby the first regulated component is a direct current, $i_d$.

6. The method according to claim 1, whereby the torque producing current component of the second two-dimensional current coordinate system is a stator current magnitude, $I_S$, and whereby the second regulated component is a stator current angle, $\gamma$.

7. The method according claim 1, whereby the motor is a permanent magnet synchronous motor, the method further comprising determining a permanent magnet flux estimate of a rotor of the motor as a function of the inductance information, and of the components of the first and second zero motor speed steady states.

8. The method according to claim 7, the method comprising operating the motor with the VSD taking the permanent magnet flux value estimate into account.

9. The method according to claim 1, the method comprising:
   detecting, at the VSD, a difference between the estimated specific static load torque at standstill and a reference value.

10. The method according to claim 1, whereby the method comprises receiving, at the VSD, motor position sensor data from one or more sensors, the one or more sensors comprising one or more of a hall sensor, of a resolver and of an optical encoder sensor.

11. The method according to claim 1, the method comprising transmitting, by the VSD, estimate information over a network.

12. A non-transitory computer-readable storage medium comprising instructions which, when executed by a processor, cause the processor to carry out the method of claim 1.

13. A variable speed drive, VSD, of a salient pole synchronous motor, the variable speed drive comprising a processor and a memory, the processor being configured to operate according to claim 1.

14. The VSD according to claim 13, whereby the VSD comprises a networking module to communicate estimate information over a network.

15. A server comprising a processor, a networking module and a memory, whereby the server is connected via a network to a plurality of variable speed drives, VSDs, each of the plurality of VSDs being of a salient pole synchronous motor, and comprising a processor, a memory and a networking module to communicate estimate information over a network, the processor of each of the plurality of VSDs being configured to operate according to claim 11, whereby the processor of the server is to compile estimate information received from the variable speed drives of the plurality of variable speed drives.

* * * * *